J. H. CLARK AND T. C. WHITEHEAD.
AUXILIARY RIM FOR TRACTOR WHEELS.
APPLICATION FILED MAY 27, 1921.

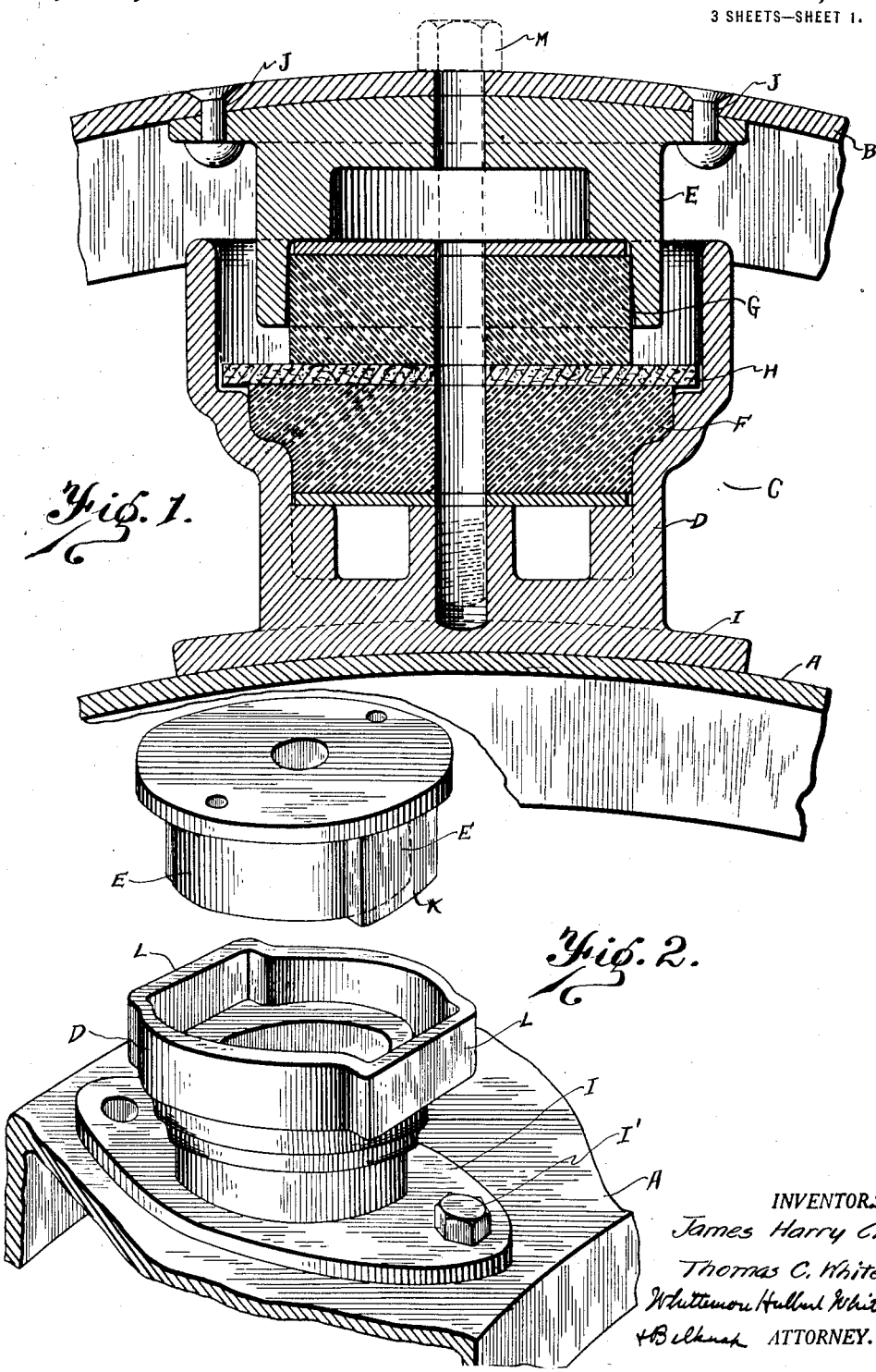

1,433,531.

Patented Oct. 31, 1922.

INVENTORS
James Harry Clark
Thomas C. Whitehead
Whittemore Hulbert Whittemore
 Belknap ATTORNEY.

J. H. CLARK AND T. C. WHITEHEAD.
AUXILIARY RIM FOR TRACTOR WHEELS.
APPLICATION FILED MAY 27, 1921.

1,433,531. Patented Oct. 31, 1922.
3 SHEETS—SHEET 3.

INVENTORS
James Harry Clark
Thomas C. Whitehead
Whittemore Hulbert Whittemore
+Belknap ATTORNEY.

Patented Oct. 31, 1922.

1,433,531

UNITED STATES PATENT OFFICE.

JAMES HARRY CLARK AND THOMAS C. WHITEHEAD, OF DETROIT, MICHIGAN.

AUXILIARY RIM FOR TRACTOR WHEELS.

Application filed May 27, 1921. Serial No. 472,981.

*To all whom it may concern:*

Be it known that we, JAMES HARRY CLARK and THOMAS C. WHITEHEAD, both citizens of the United States of America, residing at Detroit, in the county of Wayne and State of Michigan, have invented certain new and useful Improvements in Auxiliary Rims for Tractor Wheels, of which the following is a specification, reference being had therein to the accompanying drawings.

This invention relates to auxiliary rims for cleated vehicle wheels, and it is the object of the invention to provide an auxiliary rim attachable to a cleated vehicle wheel to permit the use of such a wheel upon a roadway without injury to the latter.

It is a further object of the invention to provide a resilient mounting of the auxiliary rim upon the fixed rim of the wheel.

In the drawings:

Figure 1 is a view partly in side elevation and partly in circumferential section showing the upper portion of a vehicle wheel employing the herein described auxiliary tread;

Figure 2 is a perspective view of two cup members which are employed in mounting the auxiliary rim upon the wheel;

Figure 3:
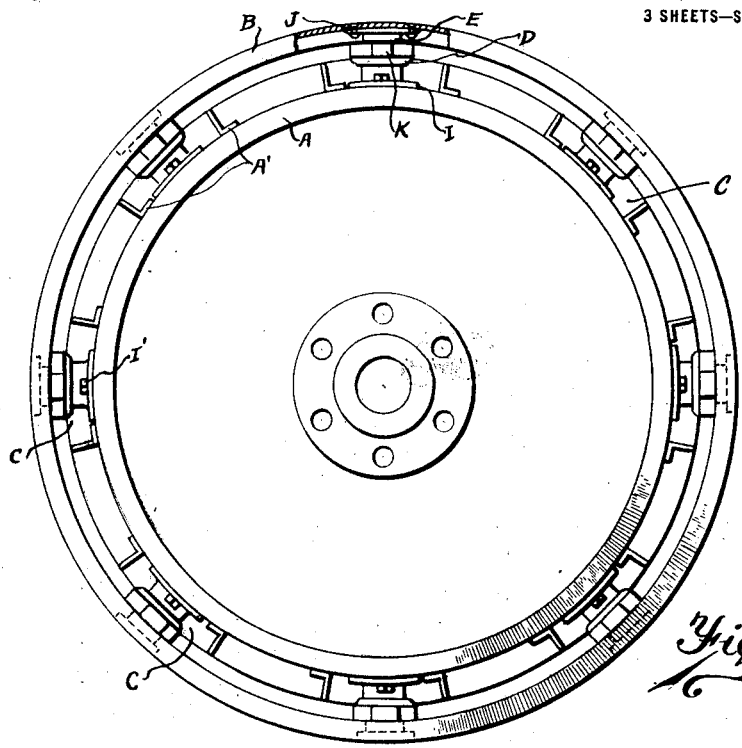
Figure 3 is a view showing in its entirety the rim portion of a vehicle wheel with the auxiliary rim mounted thereupon.

In these views, the reference character A designates the fixed rim of a vehicle wheel, and B a quick detachable auxiliary rim. The rim A is cleated as indicated at A', while the rim B is substantially smooth. In mounting the detachable rim upon the fixed rim there is employed a suitable number of uniformly circumferentially spaced yieldable units C, eight being employed in the illustrated construction. Each of these units comprises a large cup shaped member D mounted on the rim A, and a smaller inverted cup shaped member E interiorly secured to the rim B and radially projecting into the cup D, the difference in diameter of the two cupped members being sufficient to provide for a considerable relative play of one in the other. Cushioning members or blocks F and G, of suitable resilient or yielding material (such as rubber), are respectively mounted in the opposed openings of the members D and E, and between said cushioning members there is interposed a disk or plate H which may be formed of leather or like material having a low co-efficient of friction, and which serves to prevent the blocks F and G wearing one upon the other. The cup member D is formed with an integral base flange I which is adapted to be bolted to the fixed rim A as indicated at I', and the cup member E is secured to the rim B by rivets J or other suitable fastenings.

As a provision for establishing a drive between the two rims A and B, enlargements K are formed upon the cup member E at each side thereof and are adapted to fit corresponding lateral extensions L of the member D without, however, prohibiting a limited relative movement between the two rims in the plane of the wheel. M is a bolt which is used to hold the members E and D assembled, while the auxiliary rim is being attached or removed, said bolt being removed after the bolts I' and fastenings J have been applied to properly maintain the position of the parts D and E. In applying the auxiliary rim the bolts M of the several units are first tightened so as to adjust the cup members D outwardly toward the members E so that the entire assembly may be slipped upon the fixed rim A with adequate clearance. Said bolts are then adjusted to engage the members D with the permanent rim, so as to permit the bolts I' to be applied. The bolts M may now be removed, placing the wheel in condition for use.

In the normal use of tractors and like vehicles having cleated wheels, the same travel upon non-paved surfaces, usually in fields, and under such conditions cleated rims, such as are indicated at A, may be used without above described attachment. When, however, it is desired to move such a vehicle upon a roadway it is necessary to prevent the latter being damaged by the cleats. Under such conditions the described auxiliary rim is applied, said rim providing a smooth tread surface which will afford the necessary traction without injury to the roadway. To avoid damage to the vehicle when the wheels thereof encounter irregularities in the roadway, it is desirable to provide means for cushioning or absorbing the shocks resulting from such encounter. Such a provision is made in the present invention by interposing the cushioning disks F and G between the inner and outer cup members D and E, the two rims being free to undergo a limited relative movement substantially in a vertical direction to permit absorption or cushioning of shocks by said members F and G. The described relative vertical movement between the two rims, while taken care of at the top and bottom of said rims by a substantially radial movement of the two cup members, requires a relative circumferential movement of said cup members at the front and back of the wheel. Such movement is provided for by interposing the anti-friction disk H between the two cushioning members, and by the provision of ample clearance between the inner and outer cup members.

Figure 4:
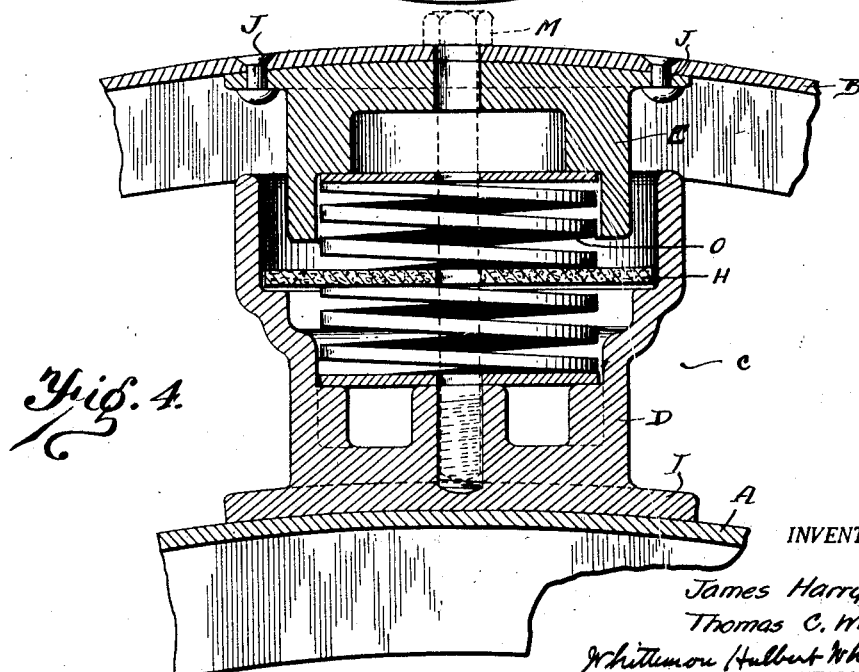
Figure 4 is a similar view showing a modification, in which coiled springs are utilized for the cushioning members.

In the modification shown in Figure 4, springs O are used in place of the first described resilient blocks F and G as the cushioning members.

Figure 5:
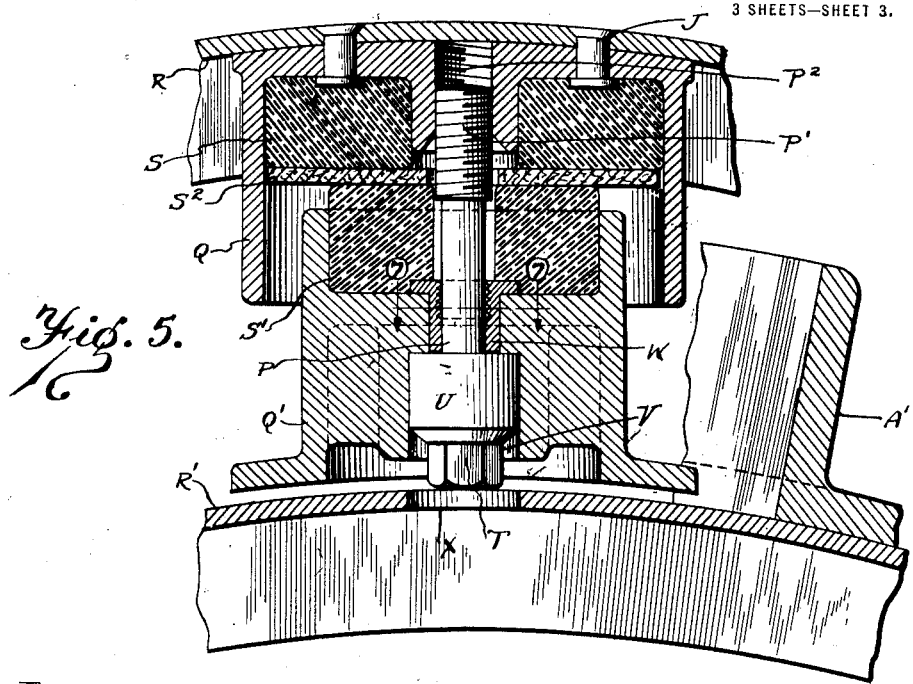
Figure 5 is a sectional view of a modified form of cushioning unit.
Figure 6:
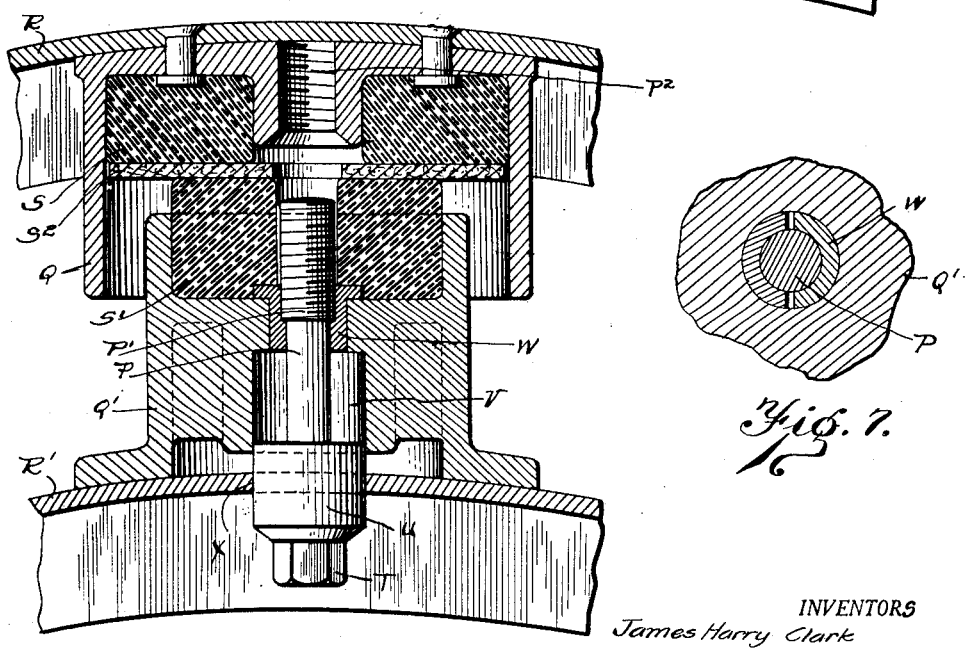
Figure 6 is a view similar to Figure 5 but showing the parts differently adjusted.
Figure 7:
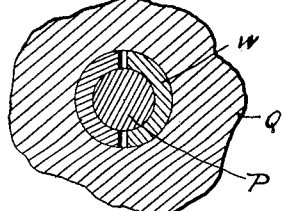
Figure 7 is a detail sectional view taken on line 7—7 of Figure 5.

In the modified construction shown in Figures 5, 6 and 7, for holding the parts of each unit normally assembled there is employed a bolt P forming a permanent element of said unit. As in the first described construction, each unit comprises telescopically engaging cup members Q and Q' respectively secured to the auxiliary rim R and the permanent rim R', and the resilient blocks S and S' are respectively disposed within said cup members, and separated by a disk $S^2$. The bolt P, which maintains the parts assembled upon the auxiliary rim when the latter is not in use, is arranged axially of the cups Q and Q'. The outer end portion P' of said bolt is slightly enlarged in diameter and is screw-threaded to engage in a bored and tapped opening $P^2$ formed centrally in the outer cup member Q. The inner end of said bolt is formed with the usual polygonal head T for engagement by a wrench, and adjacent said head the bolt has an enlarged cylindrical portion U fitting slidably within a cylindrical opening V extending into the member Q' from the inner face thereof. Intermediate the opening V and the depression receiving the cushioning member S', a two-part bushing W is engaged with the member Q' embracing the bolt P, the outer portion of said bushing being screw-threaded for engagement by the enlarged threaded end portion P' of said bolt. Said bushing is formed with a flange engaging the member Q' below the cushioning member S'. In the permanent rim R' there is formed an aperture X into which the enlarged portion U of the bolt P fits when said bolt is adjusted inwardly, as indicated in Figure 6. When the bolt P is adjusted outwardly through engagement of its screw-threaded portion P' with the threaded opening $P^2$ the enlarged portion U of said bolt is first seated in the end of the opening V and subsequently the member Q' is shifted slightly toward the member Q through the thrust of said enlarged portion against the end of the opening V; thus the member Q' is given a slight clearance from the permanent rim R' so as to allow the auxiliary rim R and the members Q and Q' carried by said auxiliary rim to be readily slipped upon the permanent rim. After establishing the auxiliary rim in embracing relation to the permanent rim with the bolts P in registration with the openings X, a wrench may be engaged through each opening X with the head T of the registered bolt P, and said bolt may be turned to adjust the same radially inward to the position disclosed in Figure 6. Through such adjustment the enlarged threaded portion P' of the bolt is disengaged from the bore $P^2$ and is engaged with the threaded outer portion of the two-part bushing W; also such an adjustment engages the enlarged portion U of the bolt in the opening X thereby fixing the cup Q' in its proper position upon the inner rim and establishing a drive from said rim to said cup member. When the auxiliary rim is not in use, the bolt P engaging in the tapped opening $P^2$ holds the members Q, Q' in assembled relation while engagement of the threaded end of said bolt with the two-part bushing W maintains the head U in the opening X to establish a drive. The two-part bushing is threaded only in its outer portion in order to avoid any possibility of the screw P completely disengaging from the assembly through inward movement. Said bushing is made in two parts as otherwise the enlarged end portions of the bolt would prevent establishment of said bushing in the desired embracing relation with the bolt.

What we claim as our invention is:

1. The combination with the permanent rim of a vehicle wheel, of an auxiliary detachable rim, said rims being relatively movable radially in their common plane of rotation, opposed cushioning elements resisting such relative movement, securing means for said elements extending perpendicular thereto and an anti-friction disk interposed between said cushioning elements.

2. The combination with the permanent rim of a vehicle wheel, of a detachable auxiliary rim, cup shaped members mounted oppositely upon said rims and fitting within each other, means centrally engaging said cup shaped members for securing them together and cushioning means within said cup shaped members.

3. The combination with the permanent rim of a vehicle wheel, of a detachable auxiliary rim, cup shaped members oppositely mounted upon said rims and fitting into each other, resilient cushioning elements mounted respectively within said cups, and an antifriction disk providing a bearing between said cushioning elements.

4. The combination with a permanent rim of a vehicle wheel, of an auxiliary detachable rim, cup shaped members mounted in opposed relation upon said rims and fitting one within the other, cushioning means within said cup shaped members transmitting the radial thrust from one to the other, the circumferential clearance between said cup shaped members being sufficient to permit a predetermined relative movement between the inner and outer rims in the common plane of rotation thereof.

5. The combination with the permanent rim of a vehicle wheel, of an auxiliary detachable rim, and a plurality of cushioning devices comprising opposed cup shaped members provided with a yieldable element therebetween mounting said auxiliary rim upon the permanent rim and sufficiently spaced from each other to provide for a relative movement of the rims both radially and circumferentially.

6. The combination with the permanent rim of a vehicle wheel and an auxiliary detachable rim, of a series of cushioning units interposed between said rims each comprising yieldable cushioning means, an abutment for said means carried interiorly by the auxiliary rim and having a threaded opening, a coacting inner abutment attachable to the permanent rim, and a bolt radially slidable in the inner abutment, and restrained from disengagement therefrom, said bolt being engageable in the threaded opening of the outer abutment to hold the unit assembled upon the auxiliary rim when the same is removed from the permanent rim.

7. The combination with the permanent rim of a vehicle wheel, of an auxiliary detachable rim, cup shaped members mounted oppositely upon said rims, and engaging one within the other, cushioning means jointly carried by said members, a securing member carried by the inner cup shaped member and radially slidable to engage an opening in the permanent rim, and an element in connection with said securing member engageable with the outer cup shaped member and adjustable thereupon to disengage said securing member from said opening.

8. The combination with the permanent rim of a vehicle wheel, and an auxiliary detachable rim, of a series of cushioning units interposed between said rims each comprising yieldable cushioning means, an abutment for said means carried interiorly by the auxiliary rim, a coacting abutment radially movable relative to the first mentioned abutment and detachably engageable with the permanent rim, and a connection between said abutments maintaining the parts of the unit assembled upon the auxiliary rim when the latter is disengaged from the permanent rim.

9. The combination with the permanent rim of a vehicle wheel, and an auxiliary detachable rim, of a series of cushioning units interposed between said rims each comprising yieldable cushioning means, an abutment member for said means interiorly carried by the auxiliary rim, a coacting abutment adapted to be secured to the permanent rim and a member adjustable to alternatively attach the inner to the outer abutment or to jointly engage the inner abutment and the permanent rim.

10. The combination with the permanent rim of a vehicle wheel having a series of orifices therein, and an auxiliary detachable rim, of a series of cushioning units interposed between said rims each comprising yieldable cushioning means, an abutment for said means interiorly carried by the auxiliary rim, a coacting inner abutment for connection to the permanent rim and a member permanently carried by the inner abutment outwardly adjustable to secure the inner abutment to the outer abutment when the auxiliary rim is not in use and inwardly adjustable to engage in an orifice of the permanent rim and establish a drive connection from said rim to the inner abutment during use of the auxiliary rim.

11. The combination with the permanent rim of a vehicle wheel, and an auxiliary detachable rim, of a series of cushioning units interposed between said rims each comprising yieldable cushioning means, inner and outer abutments for said means, the latter being carried by the auxiliary rim, said abutments having registrable openings and a member radially slidable in the inner abutment having a screw-threaded outer portion alternatively engageable with the opening of the outer abutment to maintain the unit assembled when the auxiliary rim is not in use and engageable with the capped opening of the inner abutment and with the permanent rim to establish a drive connection from the latter to the former during use of the auxiliary rim.

12. The combination with a permanent rim of a vehicle wheel and an auxiliary detachable rim, of a series of cushioning units interposed between said rims each comprising a pair of members telescopically engageable with each other, a resilient element within said members and means threadedly engageable with one member for holding said members together.

13. The combination with a permanent rim of a vehicle wheel and an auxiliary detachable rim, of a series of cushioning units interposed between said rims each comprising telescopically engageable members, a resilient element interposed therebetween and means extending through said members for adjusting them toward or from each other and holding them in predetermined relation with each other.

14. The combination with a permanent rim of a vehicle wheel and an auxiliary detachable rim, of a series of cushioning units interposed between said rims each comprising a pair of cup-shaped members telescopically engageable with each other, a resilient member interposed therebetween and means for holding said members together and adjusting them toward or from each other independent of the permanent rim.

15. The combination with a permanent rim and an auxiliary rim adapted to circumscribe said permanent rim, of intermediate members for holding said rims in spaced relation, means radially adjustable for securing said rims together and transmitting the driving torque to the auxiliary rim and for securing said intermediate members to the auxiliary rim when the latter is detached.

16. The combination with a permanent rim of a vehicle and an auxiliary detachable rim of a series of cushioning elements interposed between said rims and a member adjustable to alternatively attach each of said cushioning elements to the auxiliary or permanent rim.

In testimony whereof we affix our signatures.

JAMES HARRY CLARK.
THOMAS C. WHITEHEAD.